United States Patent [19]

Craun et al.

[11] Patent Number: 4,749,728
[45] Date of Patent: Jun. 7, 1988

[54] EPOXY/NUCLEOPHILE TRANSESTERIFICATION CATALYSTS AND THERMOSET COATINGS

[75] Inventors: Gary P. Craun, Berea; Kirk J. Abbey, Seville, both of Ohio

[73] Assignee: The Glidden Company, Cleveland, Ohio

[21] Appl. No.: 871,444

[22] Filed: Jun. 6, 1986

[51] Int. Cl.$^4$ .............................................. C08L 63/00
[52] U.S. Cl. .................... 523/400; 523/428; 525/340; 525/379; 528/93
[58] Field of Search ............... 523/400, 428; 525/340, 525/379; 528/93

[56] References Cited

U.S. PATENT DOCUMENTS

| | | | |
|---|---|---|---|
| 4,069,055 | 1/1978 | Crivello | 528/93 |
| 4,276,406 | 6/1981 | Monnerat et al. | 528/93 |
| 4,401,774 | 8/1983 | Kooymans et al. | 523/402 |
| 4,405,662 | 9/1983 | Raudenbusch et al. | 523/402 |
| 4,423,167 | 12/1983 | Valko | 523/402 |
| 4,423,168 | 12/1983 | Valko | 523/402 |
| 4,423,169 | 12/1983 | Valko | 523/402 |
| 4,489,182 | 12/1984 | Valko | 523/402 |
| 4,511,447 | 4/1985 | Valko | 204/181.7 |

*Primary Examiner*—Joseph L. Schofer
*Assistant Examiner*—Bernard Lipman
*Attorney, Agent, or Firm*—Thomas M. Schmitz

[57] ABSTRACT

A new transesterification catalyst comprises an epoxide and a non-acidic nucleophilic onium salt.

Coating compositions having hydroxyl functional resin components and carboxylic ester components adapted for curing by transesterification following application to a substrate are formulated with in-situ formed cure catalyst comprising a non-acidic nucleophile and an epoxide-to-product coatings that readily cure by transesterification. Such coatings including polyesters, polyepoxides, and polyacrylates are useful in formulating high solids coatings and powder coatings having exceptional physical properties.

Extremely low-temperature cure coatings were obtained by transesterifying mixtures of polyols and polymeric esters having multiple activated ester linkages having the structure

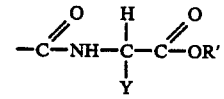

wherein R' is lower alkyl and Y is —OH and O-alkyl radicals. These coatings provide low-temperature cure coatings for paper, plastic, and wood in addition to metal substrates.

19 Claims, No Drawings

EPOXY/NUCLEOPHILE TRANSESTERIFICATION CATALYSTS AND THERMOSET COATINGS

This invention relates to thermoset solvent-borne or solvent-free coating compositions adapted to cure by transesterification and containing an in-situ formed catalyst derived from a non-acidic nucleophile and an epoxide.

BACKGROUND OF THE INVENTION

Transesterification of an ester moiety with an alcohol component is known to proceed according to the scheme:

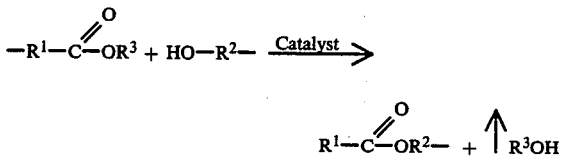

The reaction is an equilibrium reaction, that can be driven to completion by removal of the evolved alcohol especially if it is a lower molecular weight alcohol such as methanol or ethanol. Transesterification is an especially suitable reaction for producing thermoset coatings because the lower alcohols evolved during the cure easily pass out of the coating and drive the reaction to completion. Highly crosslinked films result. Several catalyst types are known for transesterification. These include acids, bases, and metal salts of organic acids. A number of patents, including U.S. Pat. No. 4,362,847; 4,376,848; 4,332,711; and 4,459,393 describe metal ion complexes and/or metal salts used for promoting transesterification. These are incorporated herein by reference for general exemplification of resinous binder types that can be crosslinked by transesterification and to illustrate the prior art catalysts such as octoates or naphthenates of lead, zinc, calcium, barium, and iron.

In U.S. Pat. No. 4,559,180 Green teaches a process for the transesterification of a carboxlic or carbonic acid ester under transesterification conditions with an alcohol in the presence of either a Group V element containing Lewis base or a cyclic amidine and an epoxide.

Kooijmans et al (U.S. Pat. No. 4,362,847 and U.S. Pat. No. 4,332,711) teach thermosetting binders for paints comprising a non-acidic hydroxyl-containing resin and a non-acidic polyester having a beta-hydroxyl ester group.

Dante and Parry have shown that phosphonium halides, such as ethyltriphenyl phosphonium iodide, are efficient catalysts for (a) 1,2-epoxide reactions with phenols to yield hydroxy ethers (U.S. Pat. No. 3,477,990), and (b) polyepoxide reactions with carboxylic acids or acid anhydrides (U.S. Pat. No. 3,547,885). Perry has shown that polyepoxides and phenols can be reacted to form phenolic hydroxy ethers with phosphonium salts as catalysts. The counterion of the phosphonium moiety is the anion portion of a carboxylic acid, or acid ester, such as in ethyltriphenyl phosphonium acetate (U.S. Pat. No. 3,948,855).

Barnhoorn et al (U.S. Pat. No. 4,459,393) teach self-crosslinking thermosetting resin compositions obtained from the reaction of a beta-hydroxyalkyl ester of an alpha, beta-carboxylic acid with a primary mono- or polyamine to give a product having 1 to 2 amino hydrogens and further reacted with a polyglycidyl ether of a polyhydric phenol so that the final resin adduct has more than one beta-hydroxyalkyl ester group and amino groups having 1 to 2 amino hydrogen atoms per molecule.

Subramanyam et al (U.S. Pat. No. 4,376,848) teach the preparation of water dilutable electrocoating compositions having tertiary amino-containing basic binders by reacting a secondary amino group compound with an olefinically double-bonded epoxy and the copolymerization of this product with at least one ethylenically bonded polymerizable monomer wherein said binders can self-cure and be cured in combination with amine resins and/or phenolic resins.

In the coatings field there is an ongoing need for improved cure catalysts that are more effective, less toxic and conform to VOC standards. Current catalysts based on amine resin/aldehyde condensation compositions reactive with hydroxyl and other acidic functionality suffer from a number of deficiencies including high cure temperature, pH dependence, formaldehyde evolution, and coloration. These deficiencies are overcome with the novel epoxy/nucleophile catalysts of the instant invention where cure is effected between an ester component and a hydroxyl component.

BRIEF SUMMARY OF THE INVENTION

The invention relates to improved coatings having hydroxyl functionality and carboxylic ester functionality adapted to cure by transesterification following application to a substrate wherein the improvement comprises adding to said coating a non-acidic nucleophile and an epoxide selected from the group consisting of a monomer, an oligomer or polymer having epoxide functionality to effect said cure. Preferred nucleophiles include onium salts and Lewis bases.

An object of the invention relates to solvent and solvent-less coating compositions comprising polyesters, polyepoxides, polyacrylates and methacrylates, polyamides, polyamines, polycarbonates and mixtures thereof and an amount of transesterification catalyst sufficient to cure such coatings when applied to a substrate, wherein the catalyst is formed in situ in the coating by the addition of about 0.001 to 1.0 milliequivalents non-acidic nucleophile and about 0.001 to 1.0 milliequivalents epoxide per gram of coating. Preferred catalyst are those derived from the in-situ reaction of an epoxide including polymeric epoxides and a non-acidic nucleophile selected from the groups consisting of onium salts and Lewis bases.

A further object relates to substrates coated with such coatings and cured by transesterification.

A yet further object relates to powder coating compositions and high solid compositions comprising resins and components adapted to crosslink by transesterification using epoxy nucleophile catalysts (ENCAT).

DETAILED DESCRIPTION OF THE INVENTION

The instant invention relates to new coatings which comprise a binder having hydroxyl functional groups and lower alkyl ester carboxylic ester functional groups adapted to cure after application to a substrate by transesterification; and an in-situ formed transesterification catalyst comprising a non-acidic nucleophile and an epoxide wherein the said epoxide is a monomeric or polymeric epoxide selected from the group consisting of $C_{2-18}$ alkylene oxides, arylalkylene oxides, cycloaliphatic oxides, and a polymeric or oligomeric epoxide having at least one epoxide group per molecule and wherein said nucleophile is selected from the group consisting of onium salts and Lewis bases.

The instant in-situ catalysts effect cure for various polyfunctional alkyl esters admixed with various polyols. For example, a coating can contain
(A) a blend of polyalkyl esters ($R$-$(CO_2R')_m$) and polyols ($R''$-$(OH)_n$); or
(B) a multifunctional compound containing both ester and hydroxyl functionality, i.e. $R'''(CO_2R')_x(OH)_y$; or
(C) a blend of (A) and (B); and
(D) an effective amount of a transesterification catalyst comprising an epoxide and a non-acidic nucleophile.

In the above coatings the further addition of a monoalcohol and/or monoester is useful for limiting crosslink density of the coating and act as film softeners.

The catalyst for the transesterification is formed in situ by the reaction of a nucleophilic compound X with an oxirane:

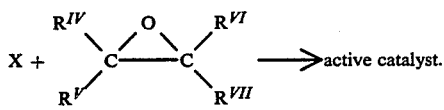
active catalyst.

wherein X is a non-acidic nucleophile or non-acidic nucleophilic onium salt. Most preferred are terminal oxiranes wherein $R^{VI}$ and $R^{VII}$ both are H as they are more reactive with nucleophiles. $R^V$ can be H or simple alkyl, simple aryl, or more complex moieties. $R^{IV}$ represents simple or complex alkyl or aryl radicals.

Examples of epoxides useful for the in-situ preparation of the cure catalyst include $C_{2-18}$ alkylene oxides and oligomers and/or polymers having epoxide functionality including multiple epoxy functionality. Particularly suitable alkylene oxides include propylene oxide, 1,2-butylene oxide, 1,2-hexylene oxide, tert-butyl glycidyl ether, phenyl glycidyl ether, glycidyl acetate, and glycidyl benzoate. Useful multifunctional oxiranes include bisphenol A diglycidyl ether, diglycidyl adipate, 1,4-diglycidyl butyl ether, Novalac resins and other commercial epoxy resins. Bisphenol A diglycidyl ether is a preferred epoxide. Also useful are acrylic polymers having epoxide functionality such as acrylic copolymers derived from glycidyl methacrylate. Oxirane compounds wherein only $R^{VI}$ and $R^{VII}$ are H include isobutylene oxide (2-methyl-1,2-propene oxide), 2-methyl-1,2-hexene oxide, 2-phenyl-1,2-propene oxide (alphamethyl styrene oxide), 2-phenoxy methyl-1,2-propene oxide, and the like. Other oxiranes include 2,3-dimethyl-2-butene oxide, 2-methyl-2-butene oxide, oleic acid oxide, and 1-phenyl propene oxide.

The nucleophilic compound X can include covalent materials such as tertiary amines, tertiary phosphines, sulfides and the like as detailed below. The compound X can be ionic wherein the anion component possesses the nucleophilic moiety. These include various "onium" halides and carboxylates as detailed below. Various other heterocyclic compounds are nucleophiles and can be used, such as imidazoles, imidazolines, thiazoles and the like. Compounds such as secondary amines or mercaptans can also be used though they are less preferred as they must react twice to form the active catalyst.

Tertiary amines useful as a component of the catalyst system can vary widely in structure and can be multifunctional. Some examples include dimethylbenzyl amine, diethyldecyl amine, tributyl amine, triethyl amine, trimethyl amine, triethylene diamine (DABCO), N-methyl morpholine, N,N'-dimethyl piperazine, N,N,N',N'-tetramethyl propane diamine and the like. A preferred tertiary amine nucleophile is triethylene diamine.

Tertiary phosphines useful as a catalyst component include triphenyl phosphine, tributyl phosphine, diethyl benzyl phosphine, dimethyl phenyl phosphine and the like. A preferred phosphine nucleophile is triphenyl phosphine.

By non-acidic nucleophile is meant a nucleophile not bearing an active hydrogen, which becomes acidic upon reaction with an epoxy. Secondary amines have an active hydrogen and, hence, must be reacted twice to generate the effective catalyst. These secondary amines, although useful, are not preferred.

Nucleophiles of the ionic type include:
(1) quaternary ammonium compounds such as tetraethyl ammonium chloride, tetrapropyl ammonium acetate, and hexyl trimethyl ammonium bromide;
(2) quaternary phosphonium compounds such as tetrabutyl phosphonium bromide and chloride, tetraphenyl phosphonium iodide and the like. (Ethyl triphenyl phosphonium acetate is a preferred nucleophile because it is commercially available at low cost.);
(3) "onium" halides and "pseudo" halides;
(4) an N-alkylated pyridinium salt such as hexadecyl pyridinium bromide, chloride, and acetate.

Other onium catalyst components include arsonium compounds such as tetraphenyl arsonium chloride and bromide and the like. Various sulfonium compounds are useful; for example, tributyl sulfonium chloride, dibutyl phenyl sulfonium acetate, S-butyl 1,4-butyl sulfonium benzoate and the like. Useful pseudo halides include cyanides, azides, cyanates and the like.

Coatings catalyzed by the epoxide/nucleophile transesterification catalysts are conveniently referred to as ENCAT coatings. ENCAT coatings comprise a wide variety of monomers, oligomers, and resins having the requisite hydroxyl and/or ester functionality include polyesters, polyacrylates, polyepoxides, polyamides, polyamines, monoalcohols, monoesters, polyols and mixtures thereof.

This invention can be used to form films from ester-terminated epoxy compounds which have exceptional physical propertes. Films prepared from blends of polyesters containing hydroxyls and esters of low boiling alcohols have good physical properties and exceptionally low raw materials costs. Low cost polyesters and small quantities of epoxy and nucleophile are used in these formulations.

Polyesters based on epoxy esters are prepared from di- and/or polyepoxide compounds such as bisphenol A diglycidyl ethers and neopentyl glycol diglycidyl ether. Monoesters of diacids such as methyl succinate are combined with the epoxides at an equivalent ratio of about 1/1 free epoxy to free acid. The acid epoxy reaction can be carried out at ~100° C. with tertiary amine catalysts such as benzyldimethyl amine, to about 90 or 95% conversion. Excess free epoxy is added if needed to give an excess epoxy concentration (over acid concentration) of ~0.2 MEQ/g. An amine such as dimethylbenzyl amine or a higher molecular weight amine such as dimethylaminopropylamine terminated diepoxides are added at about 0.2 MEQ/g tertiary amine. Polyacrylates containing epoxide monomers such as glycidyl methacrylate at about 5–40 weight % can be used in place of the diepoxide compounds.

Excess carboxylic acid, such as unreacted methylsuccinate, seem to inhibit the cure reaction. Monofunctional alcohols and esters react during the cure, giving softer films. Some ester or alcohol type solvent may be desirable for controlling hardness.

Polyesters with two or more, preferably three or more primary hydroxyls per molecule (average composition) can be cured with diesters such as diethylsuccinate, dimethyl adipate, etc., and/or polyesters with terminal esters of low boiling alcohols such as the reaction products of these diesters with diols, triols, etc. Cure with diesters has the advantage that the system is of low viscosity at 100% active ingredients. No solvents are needed in addition to the reactive diesters.

Cure conditions vary with the concentrations of free epoxy and nucleophile as well as the type of alcohol which leaves during the transesterification reaction. Lower boiling alcohols allow faster, lower temperature cures than higher boiling alcohols. Thus the adduct of EPON 828 and monomethyl succinate will cure well at 250° F. in 20 to 30 minutes, while the mono-n-butyl succinate adduct only partially cures at 300° F. in 20 minutes. The monopropargyl succinate added with EPON 828, however, had the fastest cure, showing good film properties after 20 minutes at 200° F.

ENCAT catalysts are effective curing agents for epoxy esters of EPON 828 and dicarboxylic acid monoesters. After cure, these coatings have a composition which is similar to that of epoxy/anhydride coatings, but our formulations do not contain irritating acid anhydrides. Epoxy esters prepared with methyl succinate can be cured at 300° F. to form films with 3H and 5H pencil hardness, impact resistance of 140 inch/pounds forward and reverse, excellent solvent resistance, no cracking or tape pull off in mandrel bending, and 3 T bend flexibility.

Acrylic polymer containing 15% methyl acrylamido glycolate methyl ether, MAGME (Tradename of American Cyanamid) can be cured with ENCAT catalysts at 175° F. Hardness and flexibility are somewhat less than the epoxy ester formulations, but this is a promising route to low temperature coatings formulations for plastics. Polyacrylates containing glycidyl methacrylate were esterified with methyl succinate and then crosslinked with ENCAT catalysts at higher bake temperatures.

Useful aliphatic diesters include dimethyl glutarates, dimethylsuccinate, dimethyl adipate, diethyl adipate, diisopropyl sebacate and the like. Aromatic esters of use include dimethyl isophthalate, dimethyl terphthalate, diethyl isophthalate, diethyl terephthalate, trimethyl-1,3,5-benzene tricarboxylate, trimethyl-1,3,5-naphthalene tricarboxylate and the like. Cycloaliphatic esters can include for example, dimethyl, diethyl or dipropyl 1,4-cyclohexane dicarboxylate, 1,3-cyclohexane dicarboxylate, and trimethyl 1,3,5-cyclohexane tricarboxylate. More complex polyfunctional ester compounds can include those mixtures that arise from condensation of the above simple ester compounds with diols, diamines and amino alcohols wherein an excess of ester functionality is present so as to provide soluble or fusible adducts. Halogenated esters

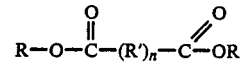

whrein R′ represents (—CClFCF$_2$), (—CF$_2$) and (—CCl$_2$) units and polyesters having silicone units in the chain will be useful in the instant coatings.

Coating compositions can be formulated from one or more of the various ester-containing components, one or more of the hydroxyl-containing components, and various blends of catalyst components. Generally, the coating will be formulated with about equal quantities of the co-reactive esters and alcohols although other ratios are useful for specific use. The coatings may include other less reactive esters or alcohols that are not considered in determining this reactive ratio. Likewise reactive diluents containing only a single reactive ester or reactive alcohol can be included in the coatings formulation in order to reduce viscosity if so desired.

Useful aliphatic polyols include ethylene glycol, propylene glycol, neopentyl glycol, 1,3-butylene glycol, 1,4-butane diol, 1,6-hexane diol, trimethylol propane, trimethylol ethane, glycerol, pentaerythritol, and the like. Various ether polyols can be used such as diethylene glycol, triethylene glycol, dipropylene glycol, dipentaerythritol and the like. Cycloaliphatic polyols can be used and include cyclohexane-1,4-dimethanol, sorbitol and the like. Aromatic based aliphatic polyols such as 1,3-dimethylol benzene, 1,4-dimethylol benzene, 1,3,5-trimethylol benzene, 1,2,5-trimethylol benzene and the like.

The quantity of catalyst components needed in the instant compositions can vary widely. Either catalyst component concentration can range from about 0.001 to 1.0, preferably 0.05 to 0.5, milliequivalents per gram of binder. The ratio of equivalents nucleophile to epoxide can vary from about 10:1 to 1:20. Preferably, an equal equivalent of nucleophilic component and of oxirane component will be used. However, the equivalent ration can vary especially toward an excess of oxirane. The concentration of catalyst components needed will depend upon the reactivity of the individual components with one another as well as upon curing temperature and time.

The presence of carboxylic acid functionality in the coating will retard the onset of transesterification. Indeed, if excessive amounts of carboxylic acid are present, the oxirane component will be entirely consumed without the formation of the catalytic intermediate necessary for transesterification. This restriction must be kept in mind while formulating coatings based on the instant invention. The retarding effect of small quantities of carboxylic acid can be used advantageously to improve the package stability of the instant coating compositions.

Curing conditions can vary widely for the instant invention. The lowest cure time and temperature attainable as a single package coating with a useful shelf life of greater than two weeks is about 200° F. for five minutes. Higher temperatures and longer times are required if the coating is formulated for longer shelf life. Alternatively, milder curing conditions are possible if at least one of the two catalyst components is withheld from the coatings composition until soon before or during application. The use of volatile covalent nucleophiles allows these coating compositions to be formulated and applied with only the oxirane component present. The oven atmosphere can contain the needed covalent nucleophile which is absorbed during the baking cycle to effect the catalyst of transesterification.

Diesters, triesters, and polyesters with terminal ester groups can be crosslinked with ENCAT catalysts when formulated with high hydroxyl content polyesters. Formulations with low molecular weight diesters can be prepared at 100% solids, with a loss of condensation by-product of about 10 to 25 weight percent during cure. Films have been prepared with a pencil hardness of H, 100 MEK rub solvent resistance, and 140-inch pounds forward and reverse impact resistance.

Catalysts prepared with onium salts and epoxides are preferred for good stability in coatings formulations. Solvent-borne paints with onium salt do not change viscosity with time, lose epoxide functionality or lose their ability to cure well. Catalysts containing tertiary amines will cure at lower temperatures, but lack the stability of those prepared with onium salts. Catalysts prepared with onium salts are also preferred for powder coatings. Tertiary amines and phosphines do not maintain their activity during the processing steps used in preparing powder coatings.

Evaluation of Film Properties

The coating was applied at 1–2 mil thickness to phosphate treated cold-rolled steel panels and baked for 20 minutes at 300° F. Film properties were evaluated using the following evaluation:

(1) marring after 100 MEK double rubs;
(2) pencil hardness;
(3) cracking after forward and reverse impact with a ⅝-inch ball up to 140-inch pounds impact; and
(4) cracking or loss of adhesion after mandrel bend down to ⅛-inch diameter 180° bend.

MEK Double Rubs

A cotton rag is wrapped around the index finger, soaked with methylethyl ketone and then wiped with a 2-inch stroke across the coated surface. Up and back motions with moderate pressure are counted as one rub. Resoak rag with MEK after each 20 rubs. Record number of rubs to the point where the coating is just removed, or after 100 rubs record percentage of mar if the coating has not been removed.

The following illustrative Examples should not be narrowly construed. Unless otherwise indicated, parts and percentages are by weight and temperature is given in degrees Centigrade.

Polyamine Adduct

A polyamino polyhydroxy polyether resinous adduct was utilized as the nucleophilic catalyst component in many of the following examples. It was prepared according to the procedure indicated in U.S. Pat. No. 4,159,233.

Dimethylaminopropyl amine (DMAPA 102) (8.52 mole parts) were mixed with 41 weight parts of xylene and heated to reflux under an inert atmosphere. To this mixture was gradually added over a period of about two hours 5,439 weight parts of Dow epoxy resin DER-671 having a molecular weight of about 1,050 (5.18 mole parts), while maintaining reflux. The reflux was continued for about two additional hours or as long as necessary to consume substantially all the oxirane functionality of the epoxy resin. The temperature of the mixture was then gradually raised to about 365° F. while removing xylene and excess amine as distillate. Most of the residual solvent and unreacted DMAPA was removed from the mixture by applying vacuum of about 24 inches of mercury while maintaining the temperature at about 365° F. until the distillation rate was nil. Then the temperature was held at 300° F. while 500 weight parts (1.87 mole parts) of a 16 carbon atom alpha-olefin epoxide (Union Carbide) was gradually added over a period of about one hour and at least for an additional 30 minutes so that the monoepoxide will fully react with the aminated precursor adduct. Finally, 3,151 weight parts of 2-butoxyethanol were stirred in. The product solution was about 62 percent by weight non-volatiles and the resinous adduct produced has base number of about 130, corresponding to a mole ratio of DMAPA to diepoxide in the product resinous adduct of about 2:1.

PROCEDURE "A"

Monoesters of Dicarboxylic Acids From Their Anhydrides

Monoesters of succinic acid and maleic acid were prepared by simply heating a mixture of the cyclic acid anhydride and an alcohol. Thus, 200 g succinic anhydride was combined with 76.8 g of Fisher absolute methanol (20% mole excess). This mixture was heated with stirring in a 500-ml. 3-neck flask to 100° C. and held for 1 hour. Methanol refluxed at 65° C., but boiling subsided as the anhydride flakes dissolved, and the temperature gradually climbed to 100° C. The ester product was cooled to 70° C. before it was poured into a 9×13 inch flat glass baking dish. The white crystalline product was air dried for 2 hours to remove excess alcohol.

PROCEDURE "B"

Epoxy Esters From Monoesters of Dicarboxylic Acids

Epoxy esters were formed from monoesters of dicarboxylic acids.

| 120 g | monomethyl succinate (from "A" above) |
| 167 g | EPON 828* (bisphenol A diglycidyl ether) |
| 0.8 g | benzyldimethylamine |

*See Table X for polymer and resin compositions used in this work. Heat the above to 100° C. under a nitrogen blanket and hold for 3 hours. Cool. Titrate product for acid and epoxy. Values should fall between 0.2 and 0.4 MEQ/g. The polymer product of this reaction contains two methyl esters from the monomethyl succinate and two hydroxyls from the opened epoxide ring.

PROCEDURE "C"

Triesters From Carboxylic Acid Diesters and Trimethylolpropane

Polyesters with an average functionality of triester were prepared with various diesters of dicarboxylic acids and trimethylolpropane, TMP.

| 261.3 g | diethyl succinate | 1.5 moles |
| 67.1 g | TMP (trimethylol propane) | 0.5 moles |
| 0.42 g | butylstannoic acid | |

The polyesters were heated under slow nitrogen blanket to 190° C., collecting ethanol in a Dean-Stark trap. Ethanol was first collected at 160° C., and 190° C. was reached 40 minutes later. A total of 64 g of distillate were collected during the 3-hour reaction. Assuming that the distillate was ethanol, the yield was a 92%.

PROCEDURE "D"

High Hydroxyl Content Polyesters

Polyesters with an average functionality of four hydroxyls were prepared as follows:

| | |
|---|---|
| 438 g | adipic acid |
| 804 g | TMP (trimethylol propane) |

The above components were combined and heated to 190° C. and evolved water collected. The heat was slowly increased to 230° C. over a 2-hour period and the reaction product cooled.

PROCEDURE "E"

Methyl Acrylamide Glycolate Methyl Ether Containing Acrylic Polymer

Methyl acrylamido glycolate methyl ether, MAGME, is an experimental monomer from American Cyanamid Company. An acrylic-containing polymer was prepared with this monomer as follows:

| (a) | 500 g | methylethyl ketone, MEK |
|---|---|---|
| (b) | 150 g | dimethylaminoethyl methacrylate, DMAEMA |
| | 90 g | 2-hydroxyethyl acrylate, 2-HEA |
| | 240 g | styrene, ST |
| | 370 g | ethyl acrylate, EA |
| | 150 g | MAGME |
| | 20 g | Vazo 64, azo initiator |
| (c) | 2 g | Vazo 64 |
| | 20 g | MEK |

The monomer mix was hazy with a brown grit from MAGME. Filter through glass wool into monomer addition funnel. Place (a) in a 2 l flask and heat to reflux with nitrogen purge. Add (b) over 4 hours. Temperature gradually rises from 78° to 85° C. Hold ½ hour, add (c), hold ½ hour, cool.

EXAMPLE 1

Using the epoxy ester prepared by Procedure "B", coatings were formulated which contained both hydroxyl functionality and methyl ester functionality. The Polyamine Adduct described above was used as the nucleophile catalyst component and EPON 828 as the oxirane component of the catalyst.

The methyl succinate ester of EPON 828 was dissolved in methylethyl ketone at 80% solids. The following components were mixed:

| | |
|---|---|
| 2.0 g. | Epoxy Ester (80% in MEK) |
| 0.10 g. | EPON 828 (5% based on epoxy ester) |
| 0.30 g. | Polyamine Adduct (15% based on epoxy ester) |

As shown in the following Table, levels of EPON 828 and Polyamine Adduct were varied. Films were prepared for baking by drawing down about 2 grams of the mixture with a 1.5-mil Byrd bar on Bonderite 1000 cold-roll steel panels.

EPOXY METHYL SUCCINATE ESTER CURE STUDIES*

| Trial # | EPON 828+ (%) | Polyamine Adduct+ (%) | T, °F. | Time (mins.) | 100 MEK Rubs |
|---|---|---|---|---|---|
| 1a | 5 | 15 | 300 | 20 | no mar |
| 1b | 20 | 15 | 300 | 20 | 30% mar |
| 1c | 0 | 15 | 300 | 20 | 70% mar |
| 1d | 5 | 7.5 | 300 | 20 | no mar |
| 1e | 5 | 2.5 | 300 | 20 | 100% mar |
| 1f | 5 | 0 | 300 | 20 | <10 rubs |
| 1g | 5 | 10 | 300 | 10 | 30% mar |
| 1h | 5 | 10 | 300 | 5 | 10 rubs |
| 1i | 5 | 10 | 250 | 20 | 50% mar |
| 1j | 5 | 10 | 225 | 20 | <10 rubs |

*2.0 g. of hydroxy ester resin used in each trial.
+% based on weight hydroxy ester resin used.

The data in the table illustrate the range of catalyst levels, cure temperatures and times that can be used. Insufficient amine carries through from the synthesis stages (Procedure "B") to catalyze reasonable cure.

EXAMPLE 2

The mono-propargyl ester of succinic acid was prepared by heating 440 g. of succinic anhydride with 246 g. of propargyl alcohol as per Procedure "A".

The addition product of 400 g. EPON 828 and 312 g. of the monopropargyl succinate was prepared by heating the neat ingredients at 100° C. for about 4 hours. Benzyl dimethyl amine, 4 ml., was used as a catalyst. Methylethyl ketone, 178 g., was added to the product after partial cooling. This product had residual acid functionality (0.20 meq./g.) and oxirane functionality (0.27 meq./g.) based on titrations. Coatings were formulated similarly to Example 1.

EPOXY PROPARGYL SUCCINATE ESTER CURE STUDIES*

| Trial # | EPON 828+ (%) | Polyamine Adduct (%) | Temperature (°F.) | 100 MEK Rubs |
|---|---|---|---|---|
| 2a | 5 | 15 | 300 | no mar |
| 2b | 0 | 15 | 300 | 70% mar |
| 2c | 0 | 0 | 300 | (2 rubs) |
| 2d | 0 | 0 | 400 | (10 rubs) |
| 2e | 5 | 33 | 300 | (incompatible system) |
| 2f | 5 | 22 | 300 | no mar |
| 2g | 5 | 7.5 | 300 | 10% mar |
| 2h | 5 | 2.5 | 300 | 10% mar |
| 2i | 5 | 15 | 250 | no mar |
| 2j | 5 | 15 | 225 | 10% mar |
| 2k | 5 | 15 | 200 | 30% mar |

*2.0 g. of hydroxy ester resin used in each trial.
+based on weight hydroxy ester resin used.

The range of responses illustrated the effect of catalyst levels, curing temperatures and times that can be used.

EXAMPLES 3-5

Mono-methyl maleic acid, mono-n-butyl succinic acid, and mono-3-butyn-1-yl succinic acid were prepared from the corresponding alcohols and anhydrides as in Procedure "A". The addition products of these acids with EPON 828 were prepared also as in Procedure "B". Coatings were formulated with 5% of EPON 828 and 15% Polyamine Adduct based on weight of the hydroxy ester resin used. The cure conditions were 300° F. for 20 minutes.

| Example # | Anhydride | Alcohol | MEK Rubs |
|---|---|---|---|
| 3 | Maleic | Methanol | 100, no mar (brown) |
| 4 | Succinic | n-Butanol | 95 |
| 5 | Succinic | 3-Butyn-1-ol | 90 |

EXAMPLES 6–10

Mono-methyl succinate and mono-propargyl succinate adducts of EPON 828 were made similarly to that specified in Procedures "A" and "B". They were used to evaluate other amines and oxiranes for catalyst activity. The coatings were cured at 300° F. for 20 minutes.

| Example # | Resin* | Catalyst Epoxy+ | Catalyst Amine+ | MEK Rubs |
|---|---|---|---|---|
| 6 | Propargyl | EPON 828 | Polyamine Adduct | 100, no mar |
| 7 | Propargyl | EPON 828 | BDMA[b] | 100, 20% mar |
| 8 | Propargyl | EPON 828 | Alkazine O[c] | 100, 80% mar |
| 9 | Methyl | TBGE[a] | Polyamine Adduct | 100, 50% mar |
| 10 | Methyl | TBGE[a] | BDMA[b] | 90 |

*Refers to the succinate ester type.
+0.2 equivalents of epoxy or amine added per gram of resin
[a]TBGE—tert-Butyl-phenyl glycidyl ether, Ciba-Geigy XU-228
[b]BDMA—Benzyl Dimethyl Amine
[c]Oleic hydroxyethyl imidazoline, Alkaril Company tradename

EXAMPLE 11

A methacrylic copolymer containing methyl methacrylate and glycidyl methacrylate was prepared according to the process of U.S. Pat. No. 4,526,945. The following ingredients were used:

| Group | Ingredients | Amount (g.) |
|---|---|---|
| A | Methylethyl ketone | 1000 |
| | Co(II) Cl$_2$.6 H$_2$O | 0.047 |
| | Dimethyl glyoxime | 0.045 |
| | Triphenyl phosphine | 0.081 |
| | KOH (0.1 N in methanol) | 2.73 |
| B | Methyl methacrylate | 867 |
| | Glycidyl methacrylate | 466 |
| | Azo-bis(isobutyronitrile) | 13.3 |
| C | Azo-bis(isobutyronitrile) | 0.5 |
| D | Azo-bis(isobutyronitrile) | 0.5 |

The group A ingredients were charged sequentially to a 5-liter round bottom flask equipped with a condenser and stainless steel paddle-type stirrer, and maintained under a nitrogen atmosphere. The admixture was heated by a mantle to reflux. The admixture of group B, which was flushed and maintained under nitrogen, was added to the refluxing catalyst solution over a two-hour period at which time the reaction temperature was 85° C. This temperature was held for 40 minutes after the feed was complete. The group C ingredient was added and the temperature maintained for about 40 minutes. Group D was then added and the reaction continued a further 40 minutes. A Dean-Stark trap was inserted between the flask and condenser and 800 ml. of solvent and residual monomer were removed. The product polymer had a weight average molecular weight of 3070 and polydispersity of 2.6 as determined by HPGPC against polystyrene standards. The polymer solution possessed 2.02 meq./g. of oxirane based on titration.

The oxirane functional polymer (150 g.) was reacted with the monomethyl succinic acid (40 g.) prepared in Procedure "A". Benzyl dimethyl amine (1.0 ml.) was used as catalyst. The reaction was conducted at 100° C. for 3 hours. The product was diluted with 20 g. methylethyl ketone during cooling.

Coatings were formulated with this ester/alcohol functional resin as follows:

| Trial # | EPON 828+ (%) | Polyamine Adduct+ (%) | MEK Rubs |
|---|---|---|---|
| 11a | 5 | 15 | 100, no mar |
| 11b | 5 | 7.5 | 100, 60% mar |

+Weight percent based on resin solution.

The coatings were baked at 300° F. for 20 minutes. Trial 11a yielded a brittle coating.

EXAMPLE 12

A hydroxyl functional acrylic copolymer was prepared with the following composition.

| Group | Ingredients | Parts |
|---|---|---|
| A | Methyl amyl ketone | 36.8 |
| B | Styrene | 24.2 |
| | Ethyl acrylate | 21.2 |
| | Hydroxypropyl methacrylate | 15.3 |
| | Methacrylic acid | .1 |
| C | Cumene hydroperoxide | 2.4 |
| | | 100.0 |

A reactor was charged with group A under a nitrogen atmosphere and heated to reflux. Group C was dissolved in about 15% of group B and added over 10 minutes. The reaction proceeded for about 15 minutes before the remainder of group B was slowly fed to the reactor. The B ingredients were fed over 2½ hours at a reaction temperature of about 144° C. After all of the B ingredients had been added, the temperature was raised to 149° C. and held for two hours before cooling.

A coating was formulated by mixing equal parts by weight of the above acrylic resin and the EPON 828-methyl succinate adduct of Example 1. EPON 828 (5% by weight) and Polyamine Adduct (15% by weight) were added. After a bake of 300° F. for 20 minutes, the film survived 50 MEK double rubs.

EXAMPLE 13

A methyl methacrylate/glycidyl methacrylate copolymer was made at a weight ratio of 9/1 by the process of U.S. Pat. No. 4,526,945. The following ingredients were needed:

| Group | Ingredients | Amount (g.) |
|---|---|---|
| A | Methylethyl ketone | 1500 |
| | Co(II) Cl$_2$.6 H$_2$O | 0.071 |
| | Dimethyl glyoxime | 0.067 |
| | Triphenyl phosphine | 0.122 |
| | KOH (.1 N in methanol) | 4.1 |
| B | Methyl methacrylate | 1800 |
| | Glycidyl methacrylate | 200 |
| | Azo-bis(isobutyronitrile) | 20 |
| C & D | Azo-bis(isobutyronitrile) | 0.5 |

The procedure was the same as Example 11 except that no solvent was removed at the end. HPGPC indicated a weight average molecular weight of 3720 and polydispersity of 2.4.

The glycidyl functional resin was reacted with mono-methyl succinic acid. Thus, 200 g. of the above resin solution was reacted with 12.7 g. of a freshly prepared succinate mono-methyl ester (prepared from 100 g. succinic anhydride and 38 g. methanol (20% excess) and 0.04 g. benzyl dimethyl amine) which had not been cooled nor had the excess methanol been removed. Further, benzyl dimethyl amine, 1.0 ml., was added as catalyst and the mixture heated to 100° C. for 3 hours. A Dean-Stark trap was then introduced and the methyl-ethyl ketone solvent was removed (flask temperature to 115° C.). On cooling, 50 ml. of PM Acetate (Dow Chemical Company) were added.

A pigment dispersion was prepared with the following:

| Ingredients | Amount (g.) |
| --- | --- |
| Hydroxyl Acrylic Resin of Example 12 | 42.5 |
| Glycidyl Acrylic Resin of Example 11 | 105.5 |
| PM Acetate (Dow Chemical) | 170.0 |
| $TiO_2$ | 510.0 |

These ingredients were loaded into a 1-liter plastic bottle which contained 4 mm. glass beads filled to a height of about 40% that of the bottle. The bottle was sealed, packed into a 1-gallon paint can, and shaken for 1 hour on a Red Devil wrist-action shaker. The pigment dispersion was filtered to remove the glass beads.

A pigmented coating was formulated with the following ingredients:

| Ingredients | Amount (g.) |
| --- | --- |
| Pigment Dispersion | 8.0 |
| Mono-methyl Succinate Acrylic Resin (of Example 11) | 5.0 |
| Mono-methyl Succinate Acrylic Resin (above) | 5.0 |
| EPON 828 | 0.6 |
| Polyamine Adduct | 1.5 |
| Additol XL-480+ | 0.1 |

+Tradename of American Hoechst Corporation for a silicone defoamer.

Coatings were cast on Bonderite 1000 cold rolled steel standard panels (Parker Chemical) with a 2-mil Byrd applicator. The coating was cured for 20 minutes at 300° F. The resulting coating had the following properties:

| Direct Impact | 50 in-lbs. |
| --- | --- |
| Reverse Impact | <10 in-lbs. |
| Mandrel Bend | Cracks entire length |

EXAMPLES 14-15

Pigmented coatings were formulated as listed:

| Ingredients | Example 14 | Example 15 |
| --- | --- | --- |
| Pigment Dispersion (Example 13) | 8.0 | 8.1 |
| Mono-methyl Succinate Acrylic (Example 11) | 10.0 | — |
| EPON 828/Mono-methyl Succinate (Example 1) | — | 10.0 |
| EPON 828 | 0.7 | 0.7 |
| Polyamine Adduct | 3.0 | 1.5 |
| Additol XL-480 | 0.04 | 0.1 |
| Ultranox 254 (Borg Warner Chemical) | — | 0.05 |

Films were cast with a 3-mil Byrd applicator, allowed to flash solvent at room temperature for 15 minutes; then baked for 20 minutes at 300° F. The cured coatings had the following properties:

| | Example 14 | Example 15 |
| --- | --- | --- |
| Pencil Hardness | 5H+ | 5H+ |
| Methylethyl Ketone Resistance | 100, no mar | not tested |
| Mandrel Bend | ⅜ in tape-off 1½ in fine cracks | pass; no cracks or tape-off |
| Impact* | | |
| Direct | 20-25 | 160 |
| Reverse | <5 | 160 |

*⅜" Dart in inch pounds.

EXAMPLE 16

A polyhydroxyl functional oligomeric polyester was prepared according to Procedure "D".

Coatings were formulated as tabulated below to demonstrate the catalytic nature of the epoxy and amine components.

| Trial # | Hydroxy Polyester | Diethyl Succinate | EPON 828 | Polyamine Adduct | MEK Rubs |
| --- | --- | --- | --- | --- | --- |
| 16a | 1.0 | 1.2 | 0.1 | — | 1 |
| 16b | 1.0 | 1.2 | — | 0.3 | 2 |
| 16c | 1.0 | 1.2 | 0.1 | 0.3 | 90 |

All coatings were baked for 30 minutes at 300° F. Qualities for each ingredient are in grams.

Clearly, cure is only effected when both catalyst components are present.

EXAMPLE 17

An oligomeric polyester with terminal ethyl ester moieties was prepared by heating 261.3 g. diethyl succinate with 67.1 g. trimethylol propane (3:1 mole ratio) with 0.42 butyl stannoic acid as transesterification catalyst. The reaction temperature was raised to a maximum of 190° C. over about 3 hours during which time 64 ml. of methanol were removed. Based on charged and removed components, this polyethyl polyester had an equivalent weight of 176.3 g. per ethyl ester moiety.

Coatings were formulated as follows:

| Ingredients | Trial 17a (g.) | Trial 17b (g.) |
| --- | --- | --- |
| Polyethyl Polyester | 17.7 | 17.7 |
| Polyhydroxyl Polyester (Example 16) | 9.5 | 9.5 |
| EPON 828 | 2.1 | 2.1 |
| Polyamine Adduct | 4.1 | 4.1 |
| Isopropanol | — | 4.0 |

The admixture of Trial 17a was incompatible and was hazy. Adding isopropanol improved compatibility, but Trial 17b still was slightly hazy. Warming Trial 17b at 60° C. gave a clear admixture. Films cast at room temperature and baked at 300° F. for 20 minutes resulted in clear films that were slightly soft (17a harder than 17b).

After 100 MEK double rubs, 17a had 10% mar; 17b had 30% mar.

EXAMPLE 18

A hydroxyl functional oligomeric polyester was prepared from 402 g. trimethylol propane (TMS), 408 g. pentaerythritol (PE), and 300 g. succinic anhydride (SA). The TMP was melted in a reactor. The SA was added and allowed to mix until homogeneous. The PE was added last at 120° C. The temperature was raised to a maximum of 230° C. over 1½ hours during which time 55 ml. of water were removed.

A coating was formulated with 10.0 g. of the above hydroxyl polyester, 12.4 g. diethyl succinate, 1.5 g. EPON 828, and 3.0 g. Polyamine Adduct. A cast film was baked at 300° F. for 20 minutes. The cured film was non-uniform due to surface tension effects, but still exhibited methylethyl ketone resistance of 30–60 double rubs.

EXAMPLES 19–20

The hydroxyl polyester of Example 16 was formulated with two other methyl ester functional compounds. The compositions are listed as follows:

| Ingredients | Example 19 (g.) | Example 20 (g.) |
| --- | --- | --- |
| Polyol Polyester | 5.0 | 5.0 |
| DBE-3 (DuPont)[a] | 4.6 | — |
| DMDC (Eastman)[b] | — | 5.2 |
| EPON 828 | 0.5 | 0.5 |
| Polyamine Adduct | 1.5 | 1.5 |

[a] A mixture of dimethyl gluterate and dimethyl adipate (about 1:9)
[b] Dimethyl 1,4-cyclohexane dicarboxylate (Technical Grade)

Films were cast and then baked at 300° F. for 20 minutes. The product films showed resistance to methylethyl ketone of 100+rubs (complete mar) and 60 rubs for Examples 19 and 20, respectively. The poorer cure with DMDC probably reflects the steric congestion in this compound.

EXAMPLES 21–33

The mono-propargyl succinate adduct of EPON 828 from Example 2 was used after storage of about 12 months to screen other nucleophiles as cocatalysts with EPON 828. Two cure temperatures were evaluated for films cast with a 1.5-mil Byrd bar. Solutions of the nucleophiles were prepared in methanol in such concentrations that 0.75 g. of solution contained the same equivalents of nucleophile as does the same weight of the Polyamine Adduct. (The actual weights are shown below.) This was added to 5.0 g. of the hydroxy ester resin and 0.25 g. EPON 828.

Actual weights: Triphenyl Phosphine, 1.10 g.+Toluene 3.90 g.; Alkazine O, 1.60 g.+Methanol 3.40 g.; HDPB, 1.60 g.+Methanol 3.40 g.; 18-Crown-6, 1.55 g.+Methanol 3.45 g.; HDTAB, 1.52 g.+Methanol 3.48 g.; HDTAC, 1.33 g.+Methanol 3.67 g.; Sodium Proprionate, 0.40 g.+Methanol 4.60 g.; Sodium Proprionate, 0.34 g.+18-Crown to 4.25 g. (from above); Triphenyl Phosphonium Bromide, 1.43 g.+Methanol 3.57 g. (not completely dissolved); TPPA (70%), 1.90 g.+Methanol 3.10 g.; Tributyl Phosphine, 0.84 g.+Methanol 4.16 g.; BHED, 0.64 g.+Methanol 4.36 g.

| Example No. | Catalyst Nucleophile | 100 MEK Rubs 360° F. | 100 MEK Rubs 284° F. | Impact (160 in Nos.) 360° F. |
| --- | --- | --- | --- | --- |
| Control | No Nucleophile | (Failed, 30 rubs) | — | Fail |
| 21 | Polyamine Adduct | No Mar | No Mar | Pass |
| 22 | Triphenyl Phosphine[1] | No Mar | No Mar | Pass |
| 23 | Tributyl Phosphine | No Mar | No Mar | Pass |
| 24 | Triphenyl Phosphonium Bromide[2] | (Failed, 15 Rubs) | — | Fail |
| 25 | Tetrabutyl Phosphonium Acetate (TBPA) | No Mar | — | Fail |
| 26 | Alkazine O | No Mar | No Mar | Pass |
| 27 | Hexadecyl Pyridinium Bromide (HDPB) | 30% Mar, Softened Darkened | 30% Mar Softened Yellowed | Fail |
| 28 | Hexadecyl Trimethyl Ammonium Chloride (HDTAC) | No Mar | No Mar | Pass |
| 29 | Hexadecyl Trimethyl Ammonium Bromide (HDTAB) | No Mar | No Mar | Pass |
| 30 | Dicyclohexane-18-Crown-6/Sodium Proprionate | 20% Mar | — | Fail |
| Control for 30 | No Crown Ether/Sodium Proprionate[3] | 20% Mar | — | Fail |
| Control for 30 | Dicyclohexane-18-Crown-6 (No Salt) | (Failed, <30 Rubs) | — | Fail |
| 31 | S,S'—bis(2-hydroxy ethyl) disulfide[4] (BHED) | (Failed 5 Rubs) | — | |
| 32 | Diphenyl Sulfide[4] | (Failed, 30 Rubs) | | |
| 33 | Thiophene[5] | (Failed, | | |

| Example No. | Catalyst Nucleophile | 100 MEK Rubs 360° F. | 284° F. | Impact (160 in Nos.) 360° F.) |
|---|---|---|---|---|
| | | 30 Rubs) | | |

[1] Toluene used as solvent. Insoluble in MeOH.
[2] This material contains acidic protons which quench the reaction.
[3] Very low gloss; poor impact.
[4] Unknown reason for failure to cure.
[5] Very volatile.

Low-Temperature Cure Coatings Thermoset Coatings

A further aspect of the invention relates to the preparation and use of polymer coatings having a multiplicity of activated lower alkyl ester moieties which surprisingly cure by transesterification at much lower temperatures.

The new low-temperature cure coatings which cure by transesterification comprise
(a) 5 to 95 weight percent polyol or polymeric polyol
(b) 95 to 5 weight percent of an activated ester or a polymer resin having a multiplicity of activated ester linkages having the structure

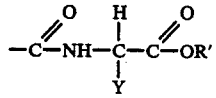

wherein R' is $C_{1-8}$ lower alkyl radicals and Y is selected from the group consisting of —OH and —O alkyl radicals.

Coatings containing activated esters are shown in U.S. Pat. No. 4,521,563 which teaches low-temperature cure pigmented coatings containing methylamidoglycolate methyl ether (MAGME). In U.S. Pat. No. 4,521,563 the crosslinking agent is an amine having a plurality of primary amine groups capable of replacing the alkoxy moiety (OR') attached to the carbonyl carbon of the ester. The amine crosslinking agent is present as an amine/aminal equilibrium mixture. The coatings of the instant invention are distinct and different from those shown in U.S. Pat. No. 4,521,563 both in reactive ingredients and cure mechanism. The U.S. Pat. No. 4,521,563 coatings do not cure by a transesterification reaction.

Preparation of Activated Ester Resins

The activated esters of this invention are readily prepared from simple esters of alpha-amino acids by acylation. The monofunction amino acid esters include L-alanine ethyl ester, DL-2-amino butyric acid methyl ester, glycine ethyl ester, glycine methyl ester, L-histidine methyl ester, p-bromo-DL-phenylalanine ethyl ester, p-chlorophenylalanine ethyl ester, L-leucine methyl ester, L-methionine methyl ester and the like. These esters may best be handled as their hydrochloride salts. Acylation is performed with polyfunction carboxylic acid derivatives. Difunctional amino acid esters such as L-cystine dimethyl ester dihydrochloride and ethylene diamine N,N'-diacetic acid dimethyl ester can be simply acylated by a monoacid chloride or anhydride. L-Serine methyl ester when acylated exemplifies the composition having both hydroxyl and activated ester moieties.

The activated esters can also be prepared by the reaction of primary amides with glyoxylic acid with subsequent alkylation to yield the structure

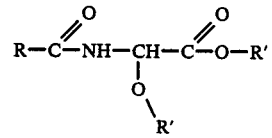

An ethylenically unsaturated example wherein R is vinyl and R' is simple alkyl such as methyl, ethyl, butyl and the like, has recently been reported (U.S. Pat. No. 4,446,280). These compounds are free radically polymerizable and copolymerizable to yield polyfunctional activated esters. When copolymerized with a hydroxy functional comonomer, then the resulting polymer possesses both hydroxyl and activated ester moieties in the same molecule.

EXAMPLE 34

The polymer was prepared with the activated ester monomer, methyl acrylamido glycolate methyl ether (MAGME) available from American Cyanamid Company. The composition and procedure are as follows:

| Group | Ingredients | Amount (g.) |
|---|---|---|
| A | Methylethyl Ketone | 155.0 |
| | Dimethylaminoethyl Methacrylate | 34.1 |
| | 2-Hydroxyethyl Acrylate | 20.5 |
| B | Styrene | 54.6 |
| | Ethyl acrylate | 84.2 |
| | MAGME* | 34.1 |
| | Vazo 64 | 4.5 |
| C | Vazo 64 | 0.5 |
| | Methylethyl Ketone | 5.0 |
| D | Vazo 64 | 0.5 |
| | Methylethyl Ketone | 5.0 |

*Methyl acrylamidoglycolate methyl ether (American Cyanamid).

The monomer mix was hazy with a brown grit from MAGME. The polymer was filtered through glass wool into an addition funnel. Group "A" was placed in a 500-ml. round-bottom flask equipped with a stainless steel paddle stirrer condenser, addition funnel, and thermometer. The solvent was brought to reflux and purged with nitrogen.

Group "B" was added over about four hours. During this time, the reaction temperature slowly rose from 78° C. to 85° C. This temperature was held for 15 minutes. After the monomer feed was complete, Group "C" was added. The reactor was held for an additional 30 minutes before Group "D" was added. The reaction was held for another 30 minutes before cooling.

A coating was formulated with 10.0 g. of the above acrylic resin, 0.6 g. of EPON 828, and 1.5 g. Polyamine Adduct. Films were cast with a 1.5-mil Byrd applicator over Bonderite 1000 steel panels. Samples were baked for 20 minutes at various temperatures as shown in the following table wherein the resulting physical properties were collated.

| TEMPERATURE | MEK RUBS | PENCIL HARDNESS | DIRECT IMPACT |
|---|---|---|---|
| 300° F. | 100, 50% mar | 2H | 140 in. lb. |
| 250° F. | 100, 50% mar | H+ | 100 in. lb. |
| 200° F. | 100, 50% mar | H | 100 in. lb. |
| 175° F. | 90 | H− | 70 in. lb. |
| 70° F.** | 90 | H− | 30 in. lb. |

**Air-dried for one month.

The air-dried film was tack-free in one hour, but had about 5 MEK rubs. After five days, the solvent resistance had increased to 30 MEK double rubs.

EXAMPLES 35-38

Acrylic copolymers containing the activated ester comonomer MAGME were prepared as follows:

| Group | Ingredient | Example 35 | Example 36 | Example 37 | Example 38 |
|---|---|---|---|---|---|
| A | Methylethyl Ketone | 350 | 350 | 350 | 350 |
|   | Dimethylaminoethyl Methacrylate | 105 | 105 | 16 | 105 |
|   | 2-Hydroxyethyl Acrylate | 63 | 63 | 63 | 63 |
| B | Methyl Methacrylate | 168 | 168 | 89 | 84 |
|   | Ethyl Acrylate | 259 | 259 | 259 | 259 |
|   | MAGME | 105 | 105 | 105 | 105 |
|   | Styrene | — | — | 168 | 84 |
|   | Vazo 64 (DuPont) | 14 | 14 | 14 | 14 |
| C | Vazo 64 | 1.4 | 1.4 | 1.4 | 1.4 |
|   | Methylethyl Ketone | 14 | 14 | 14 | 14 |

Group "A" was charged to a reactor, purged with nitrogen, and brought to reflux. For Example 35, the Group "B" ingredients were fed over a two-hour period followed by a hold for 30 minutes at about 85° C. For Examples 36, 37, and 38, Group "B" was fed over three hours and then the reaction held for 30 minutes. After the hold, Group "C" was added and the reaction held an additional 30 minutes at about 85° C. The product was then cooled.

A coating was made from the resin of Example 35 by admixing 10.0 g. of the resin with 0.5 g. EPON 828, and 1.5 g. of Polyamine Adduct. Films were baked at both 200° F. and 160° F. and yielded hard, glossy films.

EXAMPLES 39-40

The following demonstrates the ability of onium salts to catalyze general transesterification:

| Ingredients | Example 39 (g.) | Example 40 (g.) |
|---|---|---|
| Diethyl Succinate | 17.4 | 17.4 |
| n-Butanol | 15.0 | 15.0 |
| Decane (chromatographic standard) | 2.0 | 2.0 |
| EPON 828 | 1.5 | 1.5 |
| Ethyltriphenyl Phosphonium Acetate | 0.35 | — |
| Tetrabutyl Ammonium Chloride | — | 0.35 |

The above ingredients were mixed, and samples were injected in gas chromatograph for initial composition. After heating to 130° C. for ½ hour, samples were injected in gas chromatograph and change observed. Data recorded below are not corrected with response factors. Values are % of total peak areas recorded:

|  | Ethanol | n-Butanol | Diethyl Succinate | Ethyl Butyl Succinate | Dibutyl Succinate | Decane |
|---|---|---|---|---|---|---|
| Example 39 |  |  |  |  |  |  |
| Initial: | 0.46% | 44.7% | 22.2% | 0.3% | 0.00% | 29.4% |
| ½ Hour at 130° C.: | 3.60% | 34.3% | 6.3% | 14.2% | 0.70% | 29.9% |
| Example 40 |  |  |  |  |  |  |
| Initial: | 0.00% | 45.2% | 21.7% | 0.0% | 0.00% | 29.4% |
| ½ Hour at 130° C.: | 0.72% | 38.5% | 17.0% | 5.5% | 0.03% | 32.9% |

Some ethanol loss at 130° C. was expected, but ethanol was clearly produced by transesterification. Ethyl butyl succinate and dibutyl succinate appeared in significant quantities as products of n-butanol transesterification with diethyl succinate.

What is claimed is:

1. A coating composition containing catalytic amount of transesterification catalyst, and adapted for curing by transesterification upon heating, the coating composition comprising:
   a polymeric binder containing hydroxyl functional groups and lower alkyl ester carboxylic ester functional groups adapted to transesterify in the presence of catalytic amounts of a transesterification catalyst, the transesterification catalyst comprising an epoxy compound containing oxirane functionality and a non-acidic nucleophilic compound substantially free of an active hydrogen and adapted to react with the oxirane functionality to form an in-situ transesterification cure of the polymeric binder, where said non-acidic nucleophilic compound is selected from an onium salt or a Lewis base, and said coating contains between 0.001 and 1 milliequivalents of said non-acidic nucleophilic compound and between 0.001 and 1 milliequivalents oxirane compound per gram of said coating.

2. The coating composition in claim 1 where the non-acidic nucleophilic compound is a quaternary ammonium salt.

3. The coating composition in claim 1 where the non-acidic nucleophilic compound is a quaternary phosphonium salt.

4. The coating composition in claim 1 where the non-acidic nucleophilc compound is tetrabutyl phosphonium acetate.

5. The coating composition in claim 1 where the non-acidic nucleophilic compound is ethyl triphenyl phosphonium acetate.

6. The coating composition in claim 1 where the non-acidic nucleophilic compound is a tertiary phosphine.

7. The coating composition in claim 1 where the non-acidic nucleophilic compound is a tertiary amine.

8. The coating composition in claim 1 where the non-acidic nucleophilic compound is a Lewis base.

9. The coating composition in claim 8 where the Lewis base contains an element selected from the group consisting of nitrogen, phosphorum, arsenic, antimony, and bismuth.

10. The coating composition in claim 1 where the epoxy compound is selected from the group consisting of 2-18 carbon alkylene oxide, aryl alkylene oxide, cycloaliphatic oxide, and phenolic glycidyl ether, where the epoxy compound has at least one oxirane group per molecule.

11. The coating composition in claim 1 where the epoxy compound is selected from an oligomer, a monomer, or a polymer, where the epoxy compound contains at least one oxirane group per molecule.

12. The coating composition in claim 1 where the polymeric binder is selected from the group consisting of a polyester, a polyacrylate, a polyepoxy, a polyamide, a polyurethane, a polycarbonate, or mixtures thereof.

13. The coating composition in claim 1 where the polymeric binder is solvent-free and comprises an oligomer polyester polyol and a lower alkyl diester of an alkyl dicarboxylic acid.

14. The coating composition in claim 1 where the polymeric binder comprises (a) a hydroxyl functional resin or polyol, and (b) a carboxylic acid ester or carboxylic ester functional resin.

15. The coating composition in claim 14 where the polymeric binder comprises (a) between 40% and 95% by weight polyester polyol, and (b) between 5% and 60% by weight lower alkyl diester.

16. The coating composition in claim 12 where the coating is a solvent based or solvent free acrylate polymer.

17. A low-temperature polyacrylate coating of claim 16 wherein the acrylate polymer monomer components comprise from about 5 to 40 weight percent basis total monomer of an activated ester monomer capable of reacting via transesterification, having the structure:

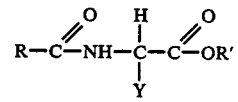

wherein R is CH$_2$=CH— or

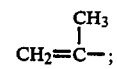

R' is lower alkyl; and Y is selected from the group consisting of —OH and O-alkyl radicals.

18. The coating of claim 17 wherein the activated ester monomer is methyl acrylamidoglycolate methyl ether.

19. A low-temperature coating composition adapted for curing by transesterification following application to a substrate which comprises
 (a) hydroxyl functional resin or polyol
 (b) carboxylic acid ester
 (c) an in-situ formed transesterification catalyst which comprises 0.001 to 1.0 milliequivalents epoxide and 0.001 to 1.0 milliequivalents non-acidic nucleophile or nucleophilic onium salt per gram of coating
wherein said carboxylic ester is an activated diester derived from an alpha amino acid.

* * * * *